United States Patent

[11] 3,571,505

[72] Inventor Frank W. Mounts
Colts Neck, N.J.
[21] Appl. No. 749,770
[22] Filed Aug. 2, 1968
[45] Patented Mar. 16, 1971
[73] Assignee Bell Telephone Laboratories, Incorporated
Murray Hill, Berkeley Heights, N.J.

[54] REDUNDANCY REDUCTION SYSTEM FOR VIDEO SIGNALS
20 Claims, 10 Drawing Figs.

[52] U.S. Cl. 178/6.8, 178/7.2, 178/7.5
[51] Int. Cl. H04n 5/38, H04n 5/44
[50] Field of Search 178/6 (BWR); 179/15.55; 325/38.1; 178/6.8

[56] References Cited

UNITED STATES PATENTS 3,347,981 10/1967 Kagan et al. 178/5
3,378,641 4/1968 Varsos et al. 179/15.55

*Primary Examiner*—Robert L. Griffin
*Assistant Examiner*—Richard K. Eckert, Jr.
*Attorneys*—R. J. Guenther and E. W. Adams, Jr.

ABSTRACT: A redundancy reduction system is described for processing video signals by comparing each digital word derived from the video signal amplitude for each picture element with a stored word corresponding to the amplitude for that picture element in a previous frame. Only if a significant difference exists between the new word and the previously stored word is the new amplitude word transmitted to the receiving location. The position of the transmitted amplitude word in the video frame is indicated to the receiver by an address word which is also transmitted. The address word indicates only the relative position of a picture element in the active region of the horizontal scanning line. The first picture element of the video frame is provided with a unique address word and in addition, the first picture element of each line is forced to be transmitted whether or not a significant difference exists between the new amplitude and previously stored amplitude. The received amplitude and address words are stored before processing in a receiving buffer memory. Initial readout of the receiving buffer memory is prohibited until a sufficient number of words have been received in order to insure proper synchronization with this unique method of addressing.

Patented March 16, 1971 3,571,505

8 Sheets-Sheet 1

INVENTOR
F. W. MOUNTS
BY Daniel D. Dubosky
ATTORNEY

Patented March 16, 1971

3,571,505

8 Sheets-Sheet 7

REDUNDANCY REDUCTION SYSTEM FOR VIDEO SIGNALS

BACKGROUND OF THE INVENTION

This invention relates to a redundancy reduction system for processing video signals, and more particularly, to a method of addressing the individual picture elements in a video frame in such a redundancy reduction system.

In the prior art, several redundancy reduction systems have been utilized in connection with space satellites for the transmission of telemetering information to the earth. In these systems a new piece of data is transmitted only when the new data from any one of several input channels represents a significant change over the previously stored data from that data channel. A reference memory in the transmitter stores the previously sampled data from all of the input channels. A new piece of data is compared with this previously stored data and if a significant difference exists, the new data is placed in the reference memory, and in addition is stored in a buffer memory for transmission to a location on earth. The buffer memory is necessary since the information from the data channels tends to be presented at a random rate, whereas transmission to the earth location is at a fixed rate.

An address generator within the transmitter provides a unique address for each of the data channels to be transmitted with each word of data stored in the buffer memory. At the receiving location, a reference memory is continuously up-dated in accordance with the received information. The address associated with each received word provides the receiver with the information necessary to determine the proper channel to be up-dated or replenished in the receiver's reference memory.

A straightforward application of the prior art techniques to a video signal would require that each picture element in the video frame have its own unique address. This would, of course, result in utilizing a large number of bits for addressing purposes and would be extremely wasteful of time and bandwidth in the transmission channel.

SUMMARY OF THE INVENTION

This method of redundancy reduction previously used in connection with telemetering data is adapted in accordance with the present invention for use with video signals. More specifically, a reference memory in the transmitting location stores an entire frame of video information in digital form, and each new digital word generated for each picture element in the camera is compared with the previously stored digital word corresponding to that picture element in order to determine whether or not there has been a significant video amplitude change in that picture element's particular location. If there has been a significant change and there is storage space available in the transmitter's buffer memory, the video amplitude digital word for that picture element is replenished in the reference frame memory and, in addition, is placed into the buffer memory along with its associated address for storage prior to transmission to the receiving location. If the buffer is full or the change is not significant, no data relative to that picture element will be transmitted to the receiver and the reference frame memory is left unchanged.

In the receiving location, the received information is stored in a buffer memory. Each video amplitude word with its corresponding address word is taken out of the buffer memory on a first-in first-out basis and placed in a flip-flop store until an address generator in the receiving location produces an output which indicates a picture element location corresponding to the stored address word. At that time, the video amplitude word is placed into a frame memory and the next amplitude and address words are removed from the buffer memory and placed in the flip-flop store.

In accordance with the present invention, a unique method of addressing each picture element is utilized in order to minimize the number of bits which must be used to identify the location of each transmitted word. More specifically, each picture element is provided with an address which corresponds to its relative location in the active region of a horizontal line period. In addition, the digital word from the first picture element of each line is forced to be transmitted whether or not a significant difference exists, the first picture element of the frame being given a unique address.

In order to synchronize the receiver initially a counter circuit in the receiving location determines when a sufficient number of digital words has been initially received to fill the receiver's buffer memory which has a capacity equal to that of the transmitter's buffer memory. Only after the receiver's buffer memory has been initially filled is the receiver permitted to read information out of the buffer memory for insertion into the frame memory at the receiver's location. As a result, proper synchronization is maintained between the transmitting and receiving locations and fewer bits are utilized for addressing than if each picture element were provided with its own distinctive address.

Another feature of the invention relates to the manner in which the initial synchronization is achieved between the transmitting and receiving locations. Initially the frame memories in both transmitting and receiving locations are loaded with a complete frame of identical words. Apparatus at the transmitting and receiving location insures that the first word to be transmitted and stored in the receiver's s buffer memory is the word corresponding to the first picture element of a frame. The address generator utilized in the receiving location is maintained in its reset state during which it provides the unique address for the first picture element of a frame at its output until the receiver's buffer memory is initially filled. Consequently, the address provided by the receiver's address generator permits the first word which is read out of the receiver's buffer memory after it has been initially filled to be processed immediately for insertion into the receiver's frame memory.

BRIEF DESCRIPTION OF THE DRAWINGS

The invention will be more fully understood when the following detailed description is read in conjunction with the drawings in which.

DETAILED DESCRIPTION

Figure 1:
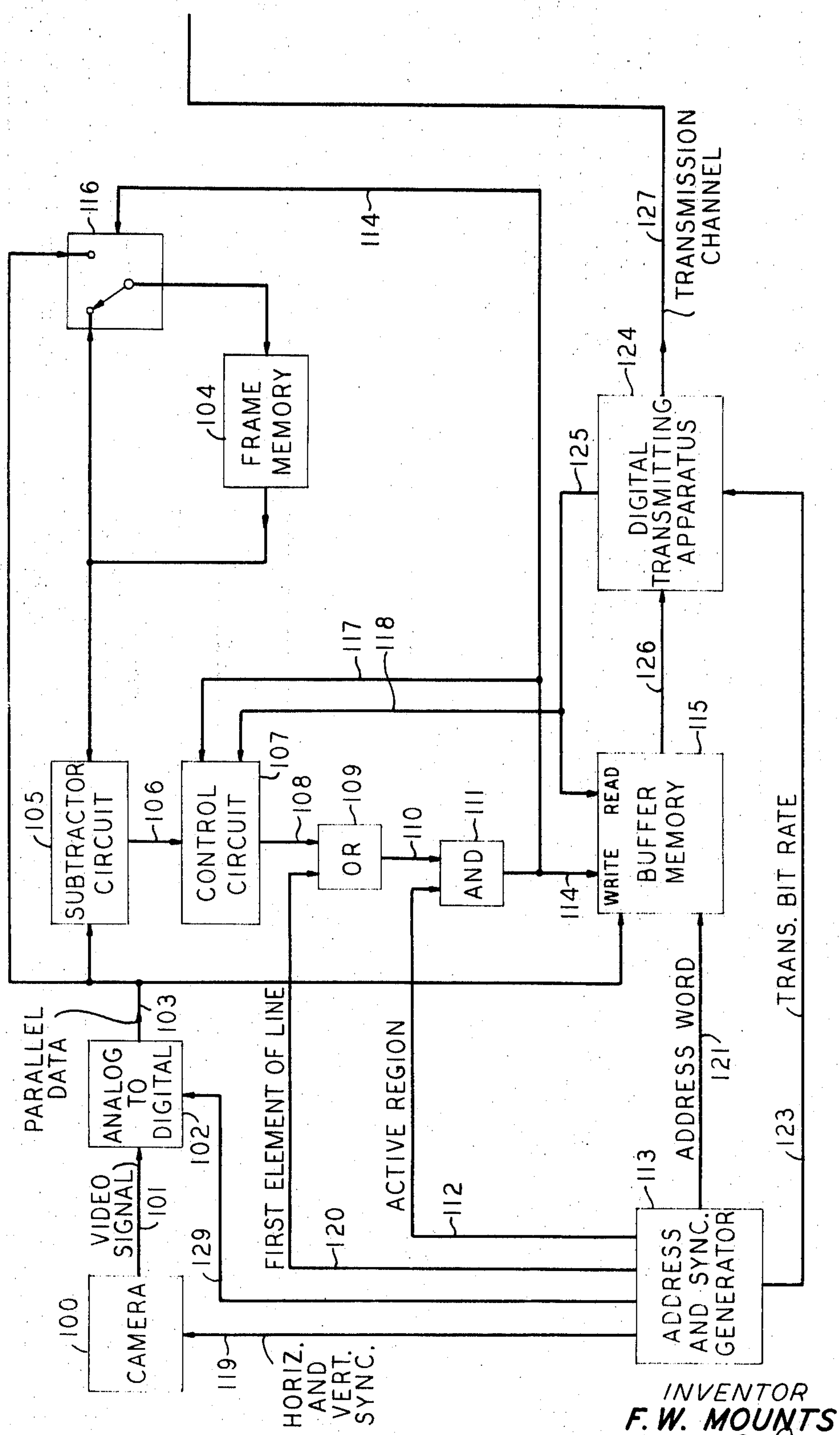
FIG. 1 is a schematic block diagram of a transmitter constructed in accordance with the present invention.
Figures 2, 8:
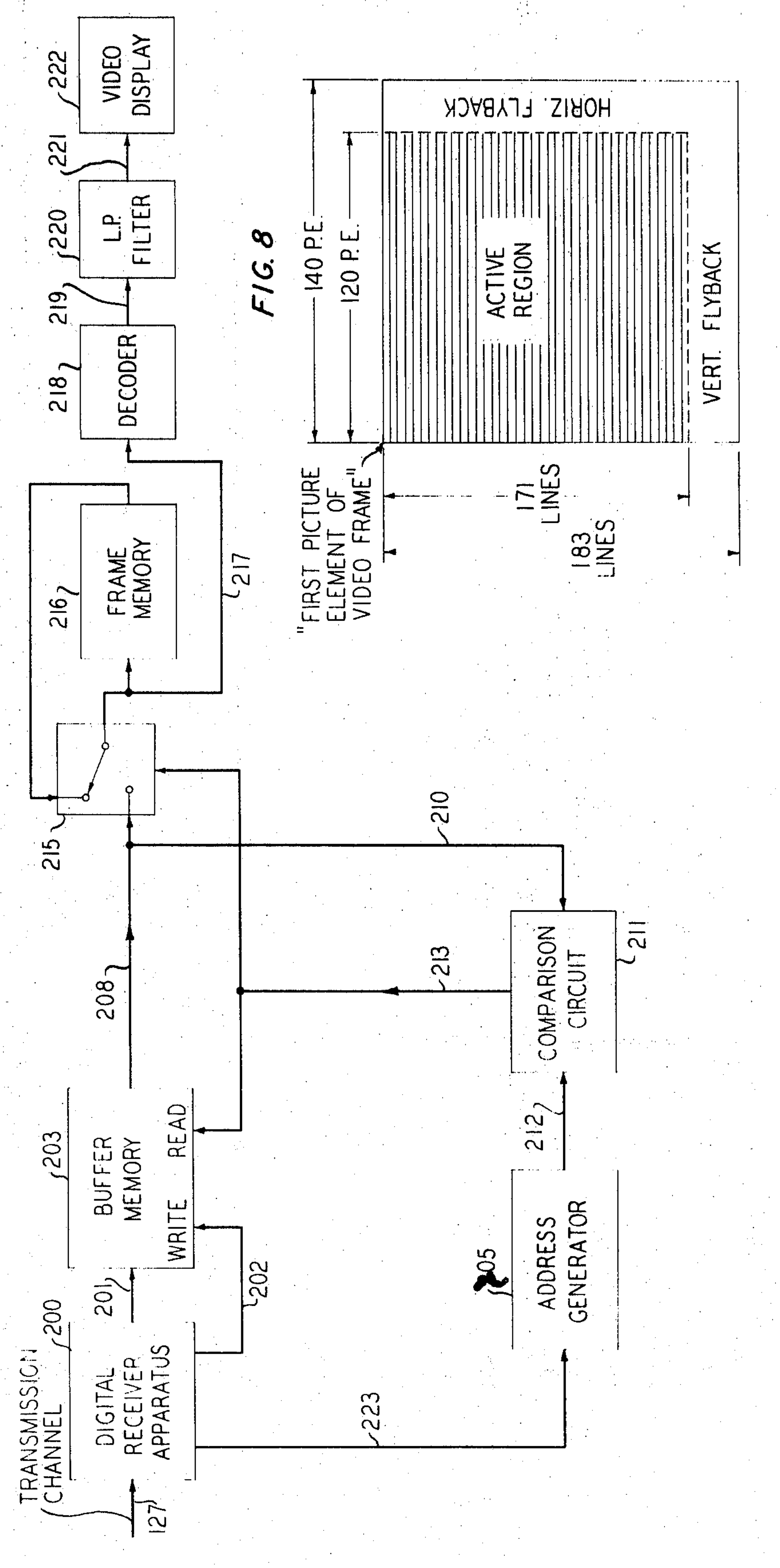
FIG. 2 is a schematic block diagram of a receiver constructed in accordance with the present invention.
FIG. 8 is a pattern in terms of picture elements and lines showing the active region and flyback intervals in a video frame.

Operation of the system can best be described in two parts: first, normal operation of the system after a process of initial synchronization has taken place, and second, the process of initial synchronization. In FIGS. 1 and 2 only the apparatus which relates to normal operation of the system after initial synchronization is shown.

In FIG. 1, a camera 100 containing a camera tube such as a vidicon, provides a video signal on line 101 to an analogue to digital converter 102. Analogue to digital converter 102 samples the amplitude of the video signal on line 101 and provides, on bus 103, a digital word representing the amplitude for each sampling. Here, as in all of the specification to follow, the term bus is utilized to designate several transmission paths in parallel, each one of which contains a different bit of the same digital word. It is assumed, here, that all of the digital words representing an entire frame of video signals have been previously stored in a frame memory 104 in a manner to be described hereinafter in connection with FIGS. 3 through 6 A subtractor circuit 105 determines the difference between the digital word on bus 103 and a digital word from frame memory 104, the latter word having the same picture element location as the digital word on bus 103. A digital word representing the absolute magnitude or the difference thereby obtained in subtractor circuit 105 is coupled by way of a bus 106 to a control circuit 107. If this difference on bus 106 represents a significant change, as determined by control circuit 107, an energizing signal is circuit by the latter on line 108. An energizing signal on line 108 causes OR circuit 109 to provide an energizing signal on line 110 at one input of AND circuit 111. If this energizing signal on line 110 is provided during the active region of the picture, that is at a time other than during the vertical and horizontal blanking intervals, an energizing signal is also present at the other input of AND circuit 111 on line 112 from an address and sync generator 113.

Accordingly, AND circuit 111 provides an energizing signal on line 114 to the write input of a buffer memory 115 and also to the energizing input of a single-pole double-throw circuit 116. Activation of circuit 116 causes the input of frame memory 104 to be connected directly to bus 103 from analogue to digital converter 102. As a result, indication of a significant difference on bus 106 causes the digital word representing this significant change to be written into buffer memory 115 and in addition to be inserted in place of the old word into frame memory 104.

The determination by control circuit 107 as to whether or not the difference on bus 106 represents a significant change is a function of the level of fullness of buffer memory 115. This fullness level is determined by control circuit 107 from the number of activating signals which have been provided to the write and read inputs of buffer memory 115. When there are fewer than a predetermined number of words in buffer memory 115, the control circuit 107 will provide an energizing signal on line 108 even though no significant difference is indicated on bus 106. This characteristic will be discussed more fully hereinafter in connection with FIG. 10.

The address and sync generator 113, in addition to providing horizontal and vertical synchronization information via line 119 to camera 100, also (a) provides an energizing signal on line 120 when the first picture element of each horizontal line is being sampled by digital to analogue converter 102; (b) provides an energizing signal on line 112 during the entire active region of the video frame; (c) provides an address word on bus 121 which represents the location of each picture element in the active region of a scanning line (a unique address being generated for the first picture element of the first horizontal line); (d) provides pulses on line 129 to analogue to digital converter 102 to synchronize its sampling rate to the rate at which picture elements are being scanned in camera 100, and finally; (e) provides pulses on line 123 which determine the transmission bit rate of digital transmitter apparatus 124.

In this embodiment the pulses provided on line 123 occur at the transmission bit rate. These pulses after being divided down in digital transmitting apparatus 124 by the number of bits in each transmitted word result in a series of pulses on line 125 coupled to the read input of buffer memory 115. In response to these pulses on line 125, each word in buffer memory 115 is read out of the buffer memory over bus 126 and converted into a serial bit stream by transmitting apparatus 124 for transmission over transmission channel 127 to the receiver shown in FIG. 2 of the drawings.

The energizing signal on line 120 which indicates that a first picture element of the horizontal line is being sampled, causes an energizing signal to be provided through OR circuit 109 on line 110 to AND circuit 111 even if control circuit 107 does not indicate that a significant difference exists. Accordingly, the first picture element of each horizontal line will cause the digital word on bus 103 to be written into the buffer memory 115 and frame memory 104 during the entire active region whether or not a significant change has occurred in this picture element.

For each digital word provided on bus 103 an address word is provided by address and sync generator 113 by way of bus 121 to an input of buffer memory 115. For the first picture element of a video frame, this address word provided by bus 121 is a unique start-of-frame word. For all of the other digital words the address provided on bus 121 indicates only the relative position occupied by that picture element in its scanning line. The particular line into which a digital word is to be inserted or replenished is determined in the receiver entirely by maintaining synchronization with the incoming digital words in the receiving location through utilization of the unique word provided for the first picture element of a video frame and the forced transmission of the first picture element in each horizontal line of the active region.

Each word transmitted on transmission channel 127 is converted by digital receiver apparatus 250 in FIG. 2 from its serial form to a parallel data form on bus 201. Each word on bus 201 contains those bits which relate to the sampled amplitude of the video signal plus the bits which relate to the address corresponding to that video sample. In addition, pulses at the rate at which the video is sampled (equal in this embodiment to the bit rate) are provided on line 223, and an energizing pulse is provided by digital receiver apparatus 200 on a line 202 at the instant when a complete digital word is available on bus 201. This energizing pulse on line 202 causes the entire digital word on bus 201 to be written into buffer memory 203. The pulses on line 223 trigger an address generator 205 to produce address words at the same rate as address and sync generator 113.

The bits in the word stored in buffer memory 203 corresponding to the address are coupled by way of bus 210 to one input of a comparison circuit 211. The other input of comparison circuit 211 is connected to receive the digital word produced by address generator 205 on bus 212. When the address from generator 205 is identical to the address provided on bus 210, comparison circuit 211 produces an energizing signal on line 213 to energize the READ input of buffer memory 203, and also to trigger the input of single-pole double-throw circuit 215. As a result, circuit 215 operates to connect the transmission bits which indicate the amplitude of the video signal from buffer memory 203 to the input of a receiving frame memory 216. Thus each word stored in buffer memory 203 is caused to be inserted into frame memory 216 when that word's address corresponds to the address word produced by address generator 205. For the interval during which generator 205 is producing address words which correspond to picture elements which have not been transmitted, circuit 215 remains in its unenergized state with the output of frame memory 216 connected back to its input, thereby causing the digital words corresponding to unchanged picture elements to be reinserted into the frame memory.

Since each transmitted word is identified only by its relative position in a scanning line, the fact that a particular word belongs to one line in frame memory 216 and not to any one of the several scanning lines which follow is determined by the fact that the first element of each line is forced to be transmitted. As a result, the first element of every line in the active region will be available from the output of buffer memory 203 to provide a comparison with the output from address generator 205. Since the buffer memories in both the transmitting and receiving locations are written into and read out on a sequential first-in first-out basis, the word for any picture element to be replenished will remain properly sandwiched between the word corresponding to the first picture element in its respective line and the word corresponding to the first picture element in the next line. Any element other than the first picture element may be chosen to be forcibly transmitted and thereby provide this type of synchronization. It is advantageous, however, to choose the first picture element in a line since the flyback interval which immediately precedes this picture element will always provide ample time for the transmitting buffer memory to be relieved of a full condition and thereby provide room in the buffer memory for the forced sample from the first picture element.

All of the digital words connected to the input of frame memory 216 are also coupled by way of bus 217 to the input of a decoder 218 which converts the digital words to amplitude samples on line 219. These amplitude samples are processed by low-pass filter 220 to produce a continuous video signal on a line 221 to a video display unit 222.

Figure 3:
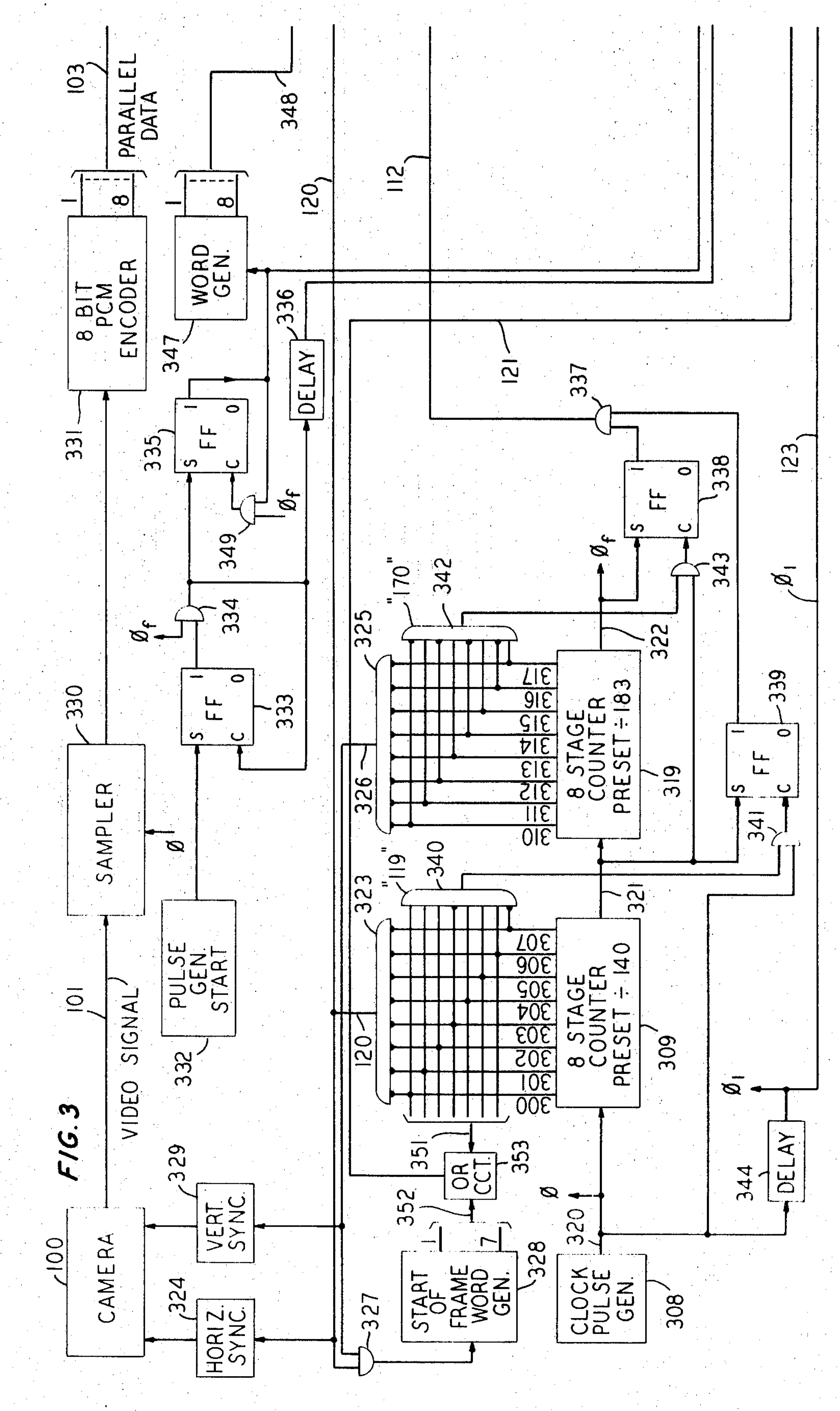
FIGS. 3, 4, 5 and 6 when placed as indicated in the key diagram of FIG. 7 provide a detailed schematic block diagram of a transmitter and reciever constructed in accordance with the present invention.
Figure 4:
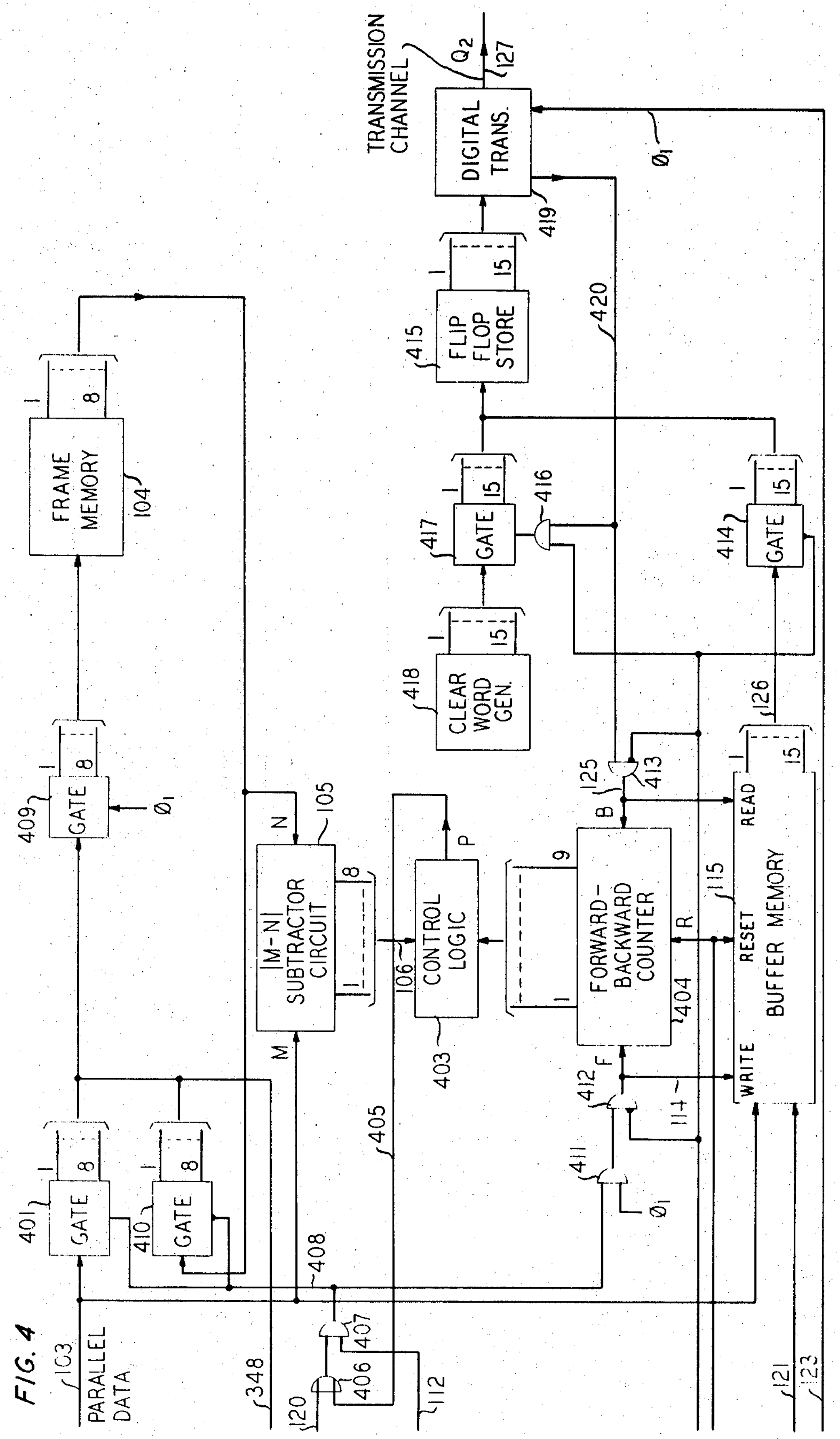
Figure 5:
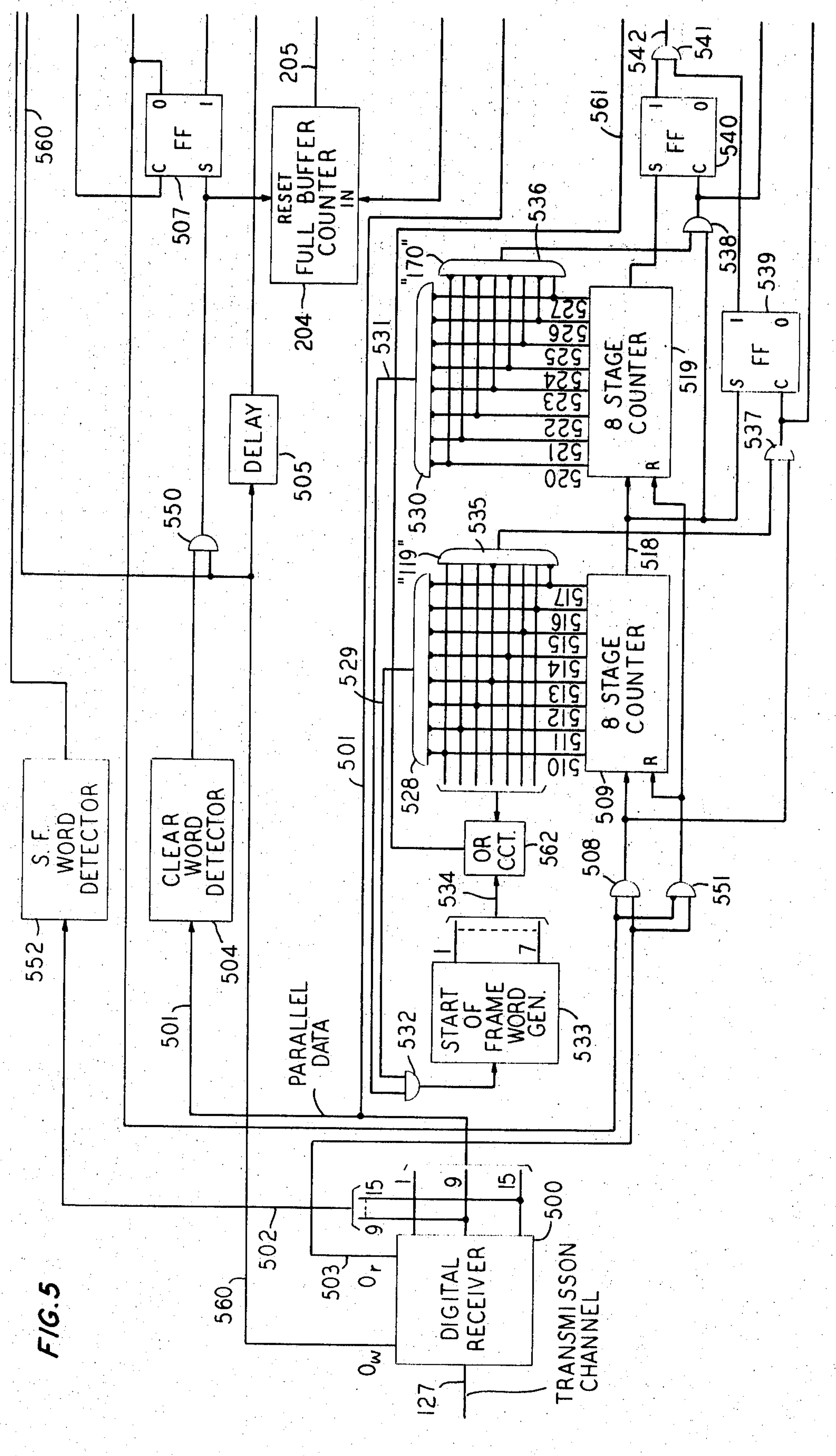
Figures 6, 7:
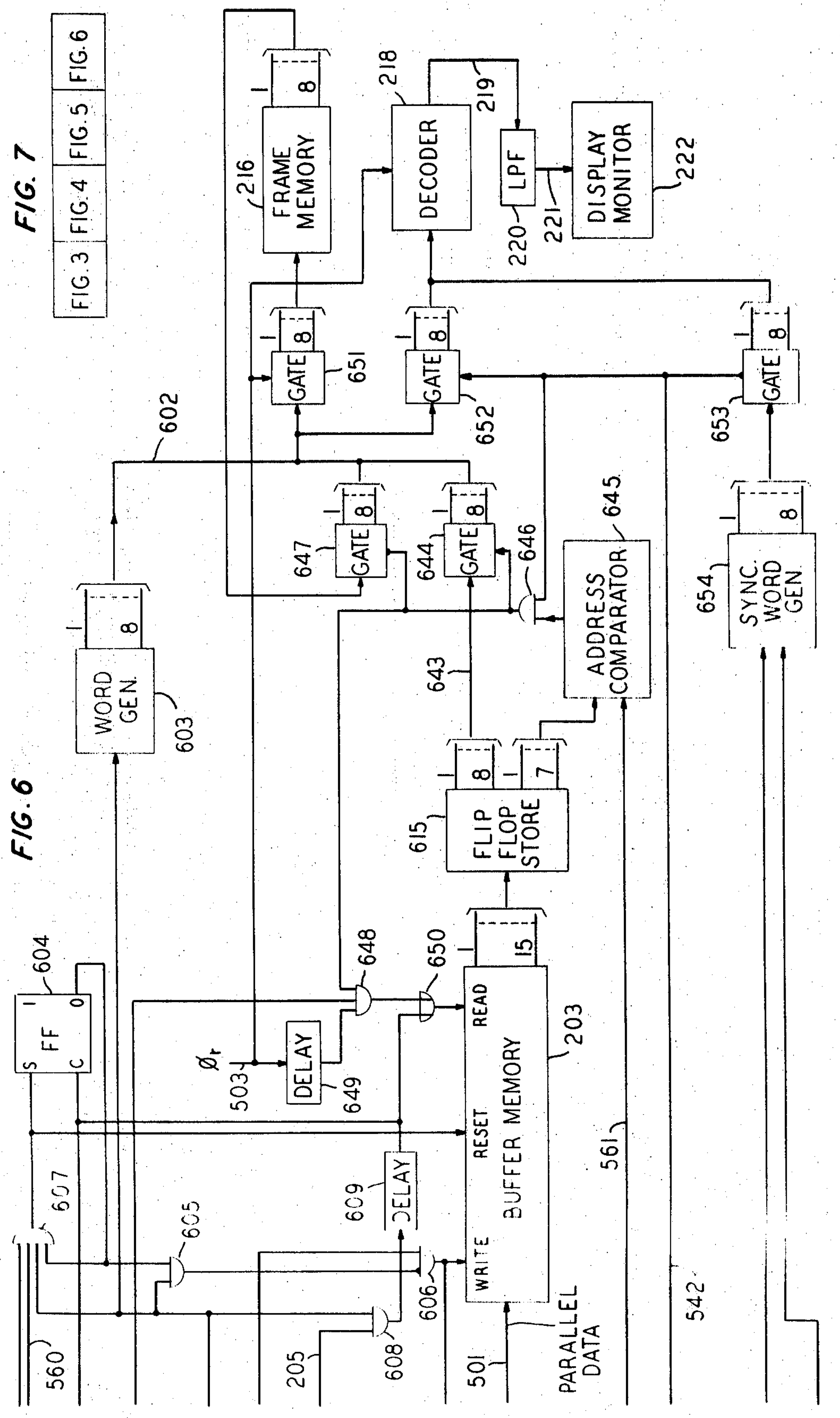

Other advantages and features of the invention especially the method of initially synchronizing the transmitting and receiving locations will be more readily understood by considering the detailed schematic block diagram of the transmitter shown in FIGS. 3 and 4 and the receiver shown in FIGS. 5 and 6.

For purposes of illustrating the embodiment shown in FIGS. 3 through 6 the system will be considered to utilize a picture format as illustrated in FIG. 8. Each scanning line in the vidicon camera of camera circuit 100 and in the kinescope of video display 222 has 120 picture elements or samples in the active region of each line period. The time required for the horizontal blanking interval is equivalent to the time required to scan 20 picture elements. The active region of each frame of video is scanned in 171 lines and the vertical blanking time required to return the scanning beam from the last active picture element of a frame to the first active picture element of the next frame is equal to 12 lines. Consequently, the entire action of scanning by the vidicon in camera circuit 100 can be illustrated by the pattern shown in FIG. 8, wherein each line period is shown to be equivalent to 140 picture elements and each frame period is shown to be equivalent to 183 lines. The first 120 picture elements of each line and first 171 lines correspond to the active region of the picture.

Address words are generated in the transmitter by a clock pulse generator 308, an eight-stage counter 309 and an eight-stage counter 319 in FIG. 3. Clock pulse generator 308 produces output pulses on line 320 to provide the pulse train designated as $\Phi$ in FIG. 3. In response to each pulse on line 320, eight-stage counter 309 advances its output digital word presented on lines 300 through 307 by one count. The digital word presented at the output of counter 309 has its least significant bit appearing on line 300 and its most significant bit appearing on line 307. To designate the 120 picture elements during the active region by a digital word only seven bits are necessary for each word. Accordingly, only lines 300 through 306 are coupled via bus 351 to provide the address word corresponding to the picture element's relative position in a scanning line. Since, however, each line interval is equivalent to the time required to scan 140 picture elements, counter 309 is required to have eight stages rather than seven, and counter 309 is preset to divide by 140 in that after the digital word 139 appears on output lines 300—307, counter 309 is reset to its 0 position by the next pulse on line 320.

At the same instant when counter 309 is reset to its 0 position, a pulse is coupled via line 321 to the input of eight-stage counter 319. The output produced on lines 310 through 317 by counter 319 represents the number of the scanning line in the picture format, the digital word 0 corresponding to the first line in the active region, and the digital word 170 corresponding to the 171st or last line in the active region. Counter 319 is preset to divide by 183, that is, after counter 319 produces a digital word 182 on outputs 310 through 317, counter 319 is reset by the next pulse on line 321 to its 0 position and an output pulse is delivered by the counter on line 322. The output pulse train thereby provided on line 322 at the frame rate is designated in FIG. 3 as $\Phi_f$.

When counter 309 presents a digital word 0 at its outputs 300—307, AND gate 323 connected to these outputs of counter 309 recognizes the presence of all 0's at its eight inhibit inputs and in response thereto provides an output pulse on line 120. This output pulse is coupled to a horizontal synchronizing circuit 324 which in turn insures that the scanning beam in camera 100 is at the position corresponding to the first picture element in a horizontal line. As all 0 output on lines 310 through 317 of counter 319 is recognized by an AND gate 325 which in turn provides an output pulse on line 326. This output pulse on line 326 is coupled to vertical synchronizing circuit 329 which insures that the scanning beam in camera circuit 100 is in a position corresponding to the first scanning line in a frame when the output pulse appears on line 326. When output pulses appear simultaneously on line 120 and 326, thereby indicating that counters 309 and 319 are both in their 0 positions, AND gate 327 produces an energizing pulse which indicates that the first picture element of a video frame is being sampled by camera circuit 100. This pulse in turn triggers a start-of-frame word generator 328 into producing a unique binary digital word on bus 352.

The digital word produced by generator 328 to indicate the start of a frame may be chosen to be any one of the digital words corresponding to the addresses generated by counter 309 during the horizontal flyback interval. In other words, the start-of-frame word may correspond to any one of the digital words representing the picture elements numbered 120 through 126 where 0 corresponds to the first picture element in a line. (The digital word corresponding to picture element position 127 for which a logical 1 is present on each of the seven lines representing bits of the word on bus 351 is not utilized to provide the indication of a start-of-frame since this word is advantageously utilized in connection with the initial synchronization process to be described hereinafter.) Since the output of counter 309 provides all 0's on each of the lines in bus 351 during the instant when generator 328 provides the start-of-frame word, each of the lines in buses 351 and 352 is coupled through an OR gate for each bit in OR circuit 353 to provide a seven bit address word at the output of OR circuit 353 on bus 121. Each logical 1 from generator 328 will override a logical 0 from counter 309.

The video signal generated on line 101 by camera 100 is coupled to the input of a sampler 330 which samples the signal in response to the pulses generated on line 320 by clock pulse generator 308. Each amplitude sample generated by sampler 330 and coupled to the input of an eight bit PCM encoder 331 is a picture element from camera 100. Encoder 331 produces in parallel data form a digital word at its output which represents the amplitude of each sample presented to it by sampler 330. This digital word is coupled by way of a bus 103 to the input of a gate circuit 401 and buffer memory 115 in FIG. 4.

The digital word on bus 103 is also coupled to one input of a subtractor circuit 105. The other input of subtractor circuit 105 is connected to receive an eight bit digital word present at the output of frame memory 104. Frame memory 104 may be constructed of eight acoustic strip delay lines, one delay line for each of the eight bits of the digital word with each line having a delay time equal to one complete video frame interval. Assuming for the present that the digital words in frame memory 104 have been properly synchronized with the scanning in camera 100, the digital word on bus 103 is presented to the one input of subtractor circuit 105 at the same instant when a digital word corresponding to the same picture element is presented to the other input of subtractor circuit 105 by frame memory 104. Although from the same picture element, the digital word from frame memory 104 represents the amplitude developed at that picture element during a previous frame.

Subtractor circuit 105 develops an eight bit digital word at its output equal to the absolute magnitude of the difference between the two digital words presented to its inputs. This eight bit digital word representing the absolute magnitude of the difference is connected to one input of a control logic circuit 403 which has a second input connected to receive the nine most significant bits from a 16 bit forward-backward counter 404. The seven least significant bits are not used by control logic circuit 403. The 16 bits presented by forward-backward counter 404 indicate the degree to which buffer memory 115 is filled to its maximum capacity. The operation of control logic circuit 403 is such that the more nearly the buffer memory 115 is filled to its maximum capacity, the greater the difference must be as indicated by subtractor 105 in order to have control logic circuit 403 provide an energizing signal on its output line 405 to indicate that the difference is a significant one. The operation of control logic circuit 403 in response to the difference indicated by subtractor circuit 105 and the number of words in the buffer memory as indicated by counter 404 is illustrated in FIG. 10.

Figure 10:
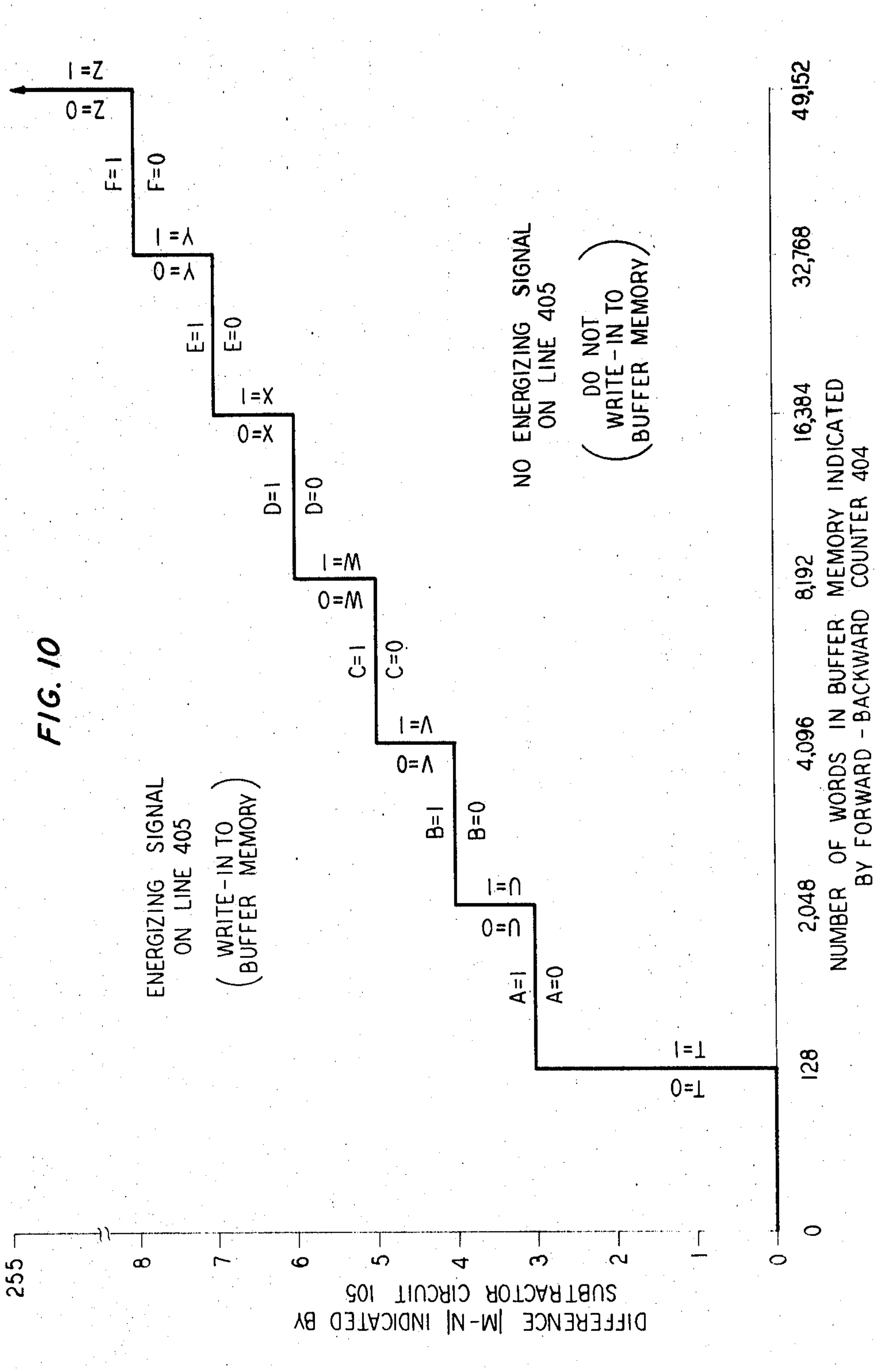
FIG. 10 is a graph which illustrates the operation of the control logic circuit shown in FIG. 9.

The universe of possible combinations of indicated differences from circuit 402 and number of words in buffer memory 115, as indicated by counter 404, is symbolized in FIG. 10 by the field of points defined by the abscissas and ordinates in FIG. 10. The staircase curve shown in FIG. 10 divides this universe into two sets: (1) those points between the axis of the ordinates and the staircase curve for which an energizing signal is produced on line 405; and (2) those points between the axis of the abscissas and the staircase curve for which no energizing signal is produced on line 405.

As illustrated in FIG. 10, if counter 404 indicates that the number of words in the buffer memory is less than 128, an output signal is generated by control logic circuit 403 on its output line 405 irrespective of the difference indicated by difference circuit 402. For any number of words in buffer memory 115 greater than 128 various differences are required to be indicated by difference circuit 402 before an energizing signal is produced on line 405. An energizing signal on line 405 is coupled through an OR gate 406 to one input of an AND gate 407. If, at the same time, an energizing signal is also present on line 112 at the other input of AND gate 407, an energizing signal is produced on line 408 at the output of AND gate 407.

As pointed out hereinabove in connection with FIG. 1, an energizing signal is present on line 112 when the scanning beam of camera 100 is in the active region of the frame. The energizing signal is developed on line 112 at the output of AND circuit 337 only when flip-flop 338 and flip-flop 339 have been set to provide energizing signals at their 1 outputs. Flip-flop 339 is set by the voltage pulse developed on line 321 each time that counter 309 is reset to its 0 position. Similarly, flip-flop 338 is set by the energizing pulse developed on line 322 each time that counter 319 is reset to its 0 position. When counter 309 develops the digital word 119 on its output 300—307 corresponding to the 120th picture element, AND gate 340 provides an energizing signal to one input of AND gate 341 whose output is connected to the clear input of flip-flop 339. The other input of AND gate 341 is energized by the first clock pulse to appear on line 320 after the 120th word 119 has been produced by counter 309. Consequently, for the picture element during the horizontal flyback interval, flip-flop 339 is in its cleared state and does not provide an energizing signal to AND gate 337. Similarly, when counter 319 produces the digital word 170 at its outputs 310—317 indicating that the 171st horizontal line is being scanned, AND gate 342 produces an energizing signal at one input of AND gate 343 whose output is connected to the clear input of flip-flop 338. The other input of AND gate 343 is connected to line 321 which provides a pulse when counter 309 is reset to its 0 position. Consequently, after the 171st line has been scanned, AND gate 343 produces an energizing signal at the clear input of flip-flop 338 thereby removing the energizing signal provided by flip-flop 338 to AND gate 337 for the entire duration of the vertical flyback interval. As a result, an energizing signal is provided on line 112 by AND gate 337 only during the active region of the video frame. During the horizontal and vertical flyback intervals, one or both of the inputs to AND gate 337 are not energized and therefore, during these intervals, line 112 does not have an energizing signal.

During the active region when there is an energizing signal on line 112, the presence of an energizing signal on line 405 from control logic circuit 403 causes AND gate 407 to produce an energizing signal on line 408. An energizing signal on line 408 in turn activates the control input of a transmission gate 401 thereby causing each of the bits present on bus 103 to be coupled through gate 401 to the input of a transmission gate 409. Gates 401 and 409 although shown symbolically as a single gate are a plurality of transmission gates, one for each bit of parallel data which is coupled to the input of the box shown in the drawings.

The clock pulses in pulse train $\Phi$ from clock pulse generator 308 are delayed by a delay circuit 344 to produce a delayed clock pulse train $\Phi_1$ whose pulses are used to trigger the control input of gate 409. The delay interval provided by delay circuit 344 insures that the circuitry preceding gate 409 has a sufficient amount of time to operate and present the correct digital word at the input of gate 409 before gate 409 is triggered. Upon receiving the delayed clock pulse in pulse train $\Phi_1$, gate 409 couples the digital word presented by gate 401 to the input of frame memory 104. In this way the new digital words present on bus 103 are loaded into the frame memory 104 when an energizing signal is present on line 408. If no energizing signal is present on line 408, a transmission gate 410, connected between the output of frame memory 104 and gate 409 is not inhibited, and therefore the digital words present at the output of frame memory 104 are coupled through gate 410 to the input of gate 409. In this way the digital words in frame memory 104 representing picture elements from previous frames are reloaded into frame memory 104 if no energizing signal is presented on line 408.

In addition to being activated by an energizing signal on line 405, AND gate 407 may also be activated during the active region by an energizing signal on line 120 at the output of AND gate 323. As pointed out hereinabove, an energizing signal is present on line 120 each and every time that counter 309 presents the digital word 0 at its outputs 300—307. Accordingly, AND gate 407 is activated to produce an energizing signal on line 408 each time that the scanning beam in camera 100 scans the first picture element in each horizontal line of the active region, whether or not a significant difference is indicated by control logic circuit 403.

Each clock pulse in pulse train $\Phi_1$ also activates AND gate 411, thereby causing the energizing signal on line 408 to be coupled through to one input of AND gate 412. After initial synchronization the inhibit input of AND gate 412 is not energized by flip-flop 335. Accordingly, AND gate 412 in response to a $\Phi_1$ pulse and an energizing signal on line 408 delivers an energizing signal to the write input of buffer memory 115 and to the forward input of forward-backward counter 404. As a result, the digital word present on bus 103 is written into buffer memory 115 and counter 404 is advanced by one count to indicate the presence of one more word being stored in memory 115. When the write input of buffer memory 115 is energized, the address word present on bus 121 at the output of OR circuit 353 from counter 309 or word generator 328 is written into buffer memory 115.

In summary, an energizing pulse on line 408 causes the digital word on bus 103 to replace a digital word in frame memory 104 and also to be written into buffer memory 115 along with its corresponding address on bus 121 whenever flip-flop 335 does not present an energizing signal to the inhibit input of AND gate 412. As will be explained hereinafter, in connection with the initial synchronization of the transmitting and receiving locations, flip-flop 335 will only provide an energizing signal to the inhibit input of AND gate 412 during an initial interval equal in duration to one frame time.

The delayed clock pulses in pulse train $\Phi_1$ are utilized by digital transmitter 419 to derive a bit rate of $\Phi_2$ bits/sec. on transmission channel 127. The change from the $\Phi_1$ pulse rate into the $\Phi_2$ bit rate may, of course, involve an integral multiplication or division depending on the bandwidth compression ratio which is desired. In the present embodiment, however, the pulse rate $\Phi_1$ is equal to the bit rate $\Phi_2$. In addition, transmitter 419 produces a pulse train $\Phi_2$ /15 on line 420 having one energizing pulse for every fifteen bits on transmission channel 127. This 15:1 division in pulses within digital transmitter 419 is the usual transformation of pulses well-known in the pulse code modulation art for converting the parallel data available at the input of a digital transmitter into serial data required for transmission over a transmission channel.

Each pulse on line 420 energizes gate 413 providing an energizing signal is not delivered by flip-flop 335 to the inhibit input of gate 413. When gate 413 is energized the read input of buffer memory 115 is activated and the backward input of counter 404 is energized, thereby reducing the count in counter 404 by one. In response to a read input, memory 115 delivers a 15 bit digital word to gate 414 which in turn passes the 15 bit digital word to a flip-flop store 415 again providing flip-flop 335 is not energized. Flip-flop store 415 may be constructed of 15 bistable multivibrators, one for each of the 15 bits in the digital word provided to its input. The word stored in flip-flop store 415 is coupled to a shift register within digital transmitter 419 and read out in serial form over transmission channel 127.

In FIG. 5 each 15 bit digital word on channel 127, containing eight bits of video amplitude information and seven bits utilized for addressing, is coupled to the input of a digital receiver 500. Receiver 500 utilizes standard techniques known in the pulse code modulation art to transform the serial bits present on channel 127 into digital words comprising fifteen bits occurring in parallel on bus 501, to derive a clock pulse train $\Phi_r$ on line 503 having a pulse rate equal to pulse train $\Phi$ in the transmitter, and in addition to derive a pulse train $\Phi_w$ on line 560 having an energizing pulse each time that a complete 15 bit word is available at the output of the receiver on bus 501. The 15 bit words on bus 501 are coupled to the input of a clear word detector 504 (to be described hereinafter in connection with the initial synchronization) and in addition to the input of a buffer memory 203. Each energizing pulse on line 560 after being delayed by a delay circuit 505 is applied to one input of AND gate 606. The other input of AND gate 606 is an inhibit input which is not provided with an energizing signal after the initial synchronization has taken place. Accordingly, after initial synchronization each energizing pulse from delay circuit 505 activates AND gate 606 and causes the write input of buffer memory 203 to be energized. As a result, the 15 bits on bus 501 are written into buffer memory 203.

Each energizing pulse of pulse train $\Phi_r$ on line 503 is connected to one input of an AND gate 508, the other input of which is connected to the 0 output of flip-flop 507. After the initial synchronization flip-flop 507 is in its cleared state and therefore provides an energizing signal at its 0 output. Consequently, each pulse on line 503 after initial synchronization activates AND gate 508 thereby triggering the input of eight-stage counter 509. Counter 509 is identical in construction to counter 309 and similarly provides at its outputs 510—517 an eight bit digital word corresponding to the location of picture elements within a line interval. Since the pulses in pulse train $\Phi_r$ appear at the same rate as the pulses in pulse train $\Phi$, counter 509 is stepped to provide digital words at its output at the same rate as is provided by counter 309. Counter 509, like counter 309, is also preset to divide by 140, and therefore an output pulse on line 518 is provided to the input of an eight-stage counter 519 when counter 509 is reset to its 0 position. Counter 519 is identical in its construction to counter 319 and provides at its outputs 52 0 through 527 a digital word which indicates the number of the horizontal line under consideration in the receiver. AND gate 528 provides an energizing signal on line 529 when counter 509 presents the digital 0 at its output. AND gate 530 similarly provides an energizing signal on line 531 when counter 519 presents the digital word 0 at its outputs. Accordingly, the energizing signals on lines 529 and 531 are combined in an AND gate 532 to trigger a start-of-frame word generator 533.

When both counters are in their positions corresponding to the instant when the first picture element of a frame is being inserted into the receiving frame memory, start-of-frame word generator 533 (like generator 328) produces a unique seven bit address on bus 534 During the other picture elements the outputs seven counter 509 are taken directly as the address to indicate the horizontal positioning of the picture element being inserted into the receiving frame memory. The unique word produced by generator 533 must be identical to the word produced by generator 328. Each line in bus 534 is connected to one input of an OR gate in OR circuit 562 the other input of which is connected to its corresponding line from the output of counter 509 to develop at the output of OR circuit 562 an address word on bus 561. The appearance of a digital 1 on any of the 7 bits from generator 533 will override a digital 0 on any one of the outputs from counter 509.

AND gates 535 and 536 are connected to the outputs of counters 509 and 519, respectively, each having the proper inhibit inputs to provide at their respective outputs energizing signals during the picture element having the address 119 and during the 171st line, respectively. AND gates 537 and 538 together with flip-flops 539 and 540 respond to the outputs of AND gates 535 and 536 and to the counters 509 and 519 to energize gate 541 and thereby produce an energizing signal on line 542 only during the counter outputs which correspond to the active region of the video frame in the same way as the equivalent circuitry described hereinabove in connection with the transmitter which produced an energizing signal on line 112.

When a digital word is read out of buffer memory 203, it is stored in flip-flop store 615. Store 615 like store 415 may be constructed of 15 bistable multivibrators, each one of which is associated with one of the digital bits in the 15 bit word from the output of buffer memory 203. The eight bits relating to the video amplitude are connected from store 615 over bus 643 to the input of a transmission gate 644. The seven bits from store 615, giving the address of the particular picture element being considered, are connected to one input of an address comparator circuit 645. The other input of address comparator 645 is connected by bus 561 to the outputs of counter 509 and word generator 533 via OR circuit 562.

When the address from flip-flop store 615 is identical to the address provided on bus 561 either by counter 509 or word generator 533, address comparator 645 produces an energizing signal at one input of AND gate 646. The other input of gate 646 is connected to line 542 which, as pointed out hereinabove, is energized during the entire active region as indicated by the outputs of counters 509 and 519. Accordingly, if an address comparison is obtained during the active region, gate 646 energizes the control input of a transmission gate 644, inhibits the control input of a transmission gate 647, and in addition, energizes one input of AND 0 648. As indicated hereinabove, flip- flop 507 produces an energizing signal at its 0 output after the initial synchronization process, and therefore a second input of AND gate 648 is also energized. The third input of AND gate 648 is energized by a pulse from the pulse train $\Phi_R$ on line 503 after the pulse has been delayed by a delay circuit 649.

An energizing signal at the output of AND gate 648 couples through OR gate 650 and triggers the read input of buffer memory 203 thereby causing a new fifteen bit digital word to be entered into flip-flop store 615. Delay circuit 649 is necessary in order to insure that a new word is not inserted into flip-flop store 615 before the old eight bit digital word indicating amplitude has been coupled to the input of frame memory 216 through transmission gate 644 and a transmission gate 651 in response to a pulse in the $\Phi_r$ train at the control input of gate 651.

During the intervals when address comparator 645 does not indicate that a comparison exists between the address word stored in flip-flop 615 and the address being generated by counter 509, the eight digital words in frame memory 216 are coupled from the output of this frame memory through a transmission gate 647 to the inputs of transmission gates 651 and 562. Upon the appearance of a clock pulse in pulse train $\Phi_r$ on line 503, gate 651 couples the eight bit digital word to the input of frame memory 216. In this way the digital words from the output of frame memory 216 are reinserted into the frame memory 216 whenever a comparison is not indicated by address comparator 645.

When, however, a comparison is obtained by comparator 645, transmission gate 647 is inhibited by the output from AND gate 646, and the new 8 bit digital word from flip-flop store 615 is coupled through transmission gate 644 to the input of transmission gate 651. During the next pulse in pulse train $\Phi_r$, this new word is coupled through gate 65 to the input of frame memory 216. In this way the digital words within frame memory 216 are up-dated by the newly received information from the transmitting location.

During the active region of the frame, the control input of transmission gate 652 is energized by the signal on line 542 and the eight bit digital words coupled to the input of transmission gate 651 are coupled through gate 652 to the input of a decoder 218. In response to the pulses in pulse train $\Phi_r$ on line 503, decoder 218 transforms the eight bit digital words into pulse amplitude samples. The pulse amplitude samples are integrated by a low pass filter 220 to produce a continuous analogue video signal on line 221 at the input of display monitor 222 or for application to any desired utilization circuit.

During the vertical and horizontal flyback intervals when an energizing signal is not present on line 542 the inhibit control input of a transmission gate 653 is not energized and therefore the digital words from sync word generator 654 are coupled through gate 653 to the input of decoder 218. These synchronizing digital words are transformed by decoder 218 and low pass filter 220 to provide display monitor 222 with an analogue synchronizing signal during the flyback intervals. Sync word generator 654 is, inturn, synchronized and triggered into operation by AND gates 537 and 538 which produce output energizing signals at the start of the horizontal and vertical flyback intervals, respectively.

INITIAL SYNCHRONIZATION

Up to this point in the specification, operation of the system has been described assuming that some process of initial synchronization has taken place. The initial synchronization occurs in two steps each of which prevents a different type of error. First, since only the information relating to picture elements which have changed is transmitted, it is necessary for both frame memories to start with a complete frame of identical words. Otherwise a picture element which has been passed over by the transmitter as an unchanged element may continue to be in error at the receiving end since the initial word stored in the receiving frame memory may not be identical to the corresponding word in the transmitting frame memory. Accordingly, during the first step of the initial synchronization both frame memories are loaded with an entire frame of identical words having 1's in each of their bit locations.

The second step of the initial synchronization process takes place entirely at the ,ocation. This step consists of prohibiting initial readout of the receiving buffer memory until the buffer memory, which has a capacity equal to that of the transmitter's buffer memory, is completely filled by incoming data. In a general pulse code modulation system without any redundancy reduction where each sample is encoded into N bits and samples are taken at a rate of $\Phi$ samples/second, a transmission rate of $N\Phi$ bits per second is necessary to transmit each and every sample. If a transmission bandwidth compression ratio of R is to be achieved, the bit rate $\Phi_2$, on channel 127 must be equal to $N\Phi/R$ bit per second. In an embodiment utilizing redundancy reduction, additional bits are necessary with each word for addressing purposes. Where A equals the number of bits utilized for addressing each word, the word rate, W, on the transmission channel equals $N\Phi/R(N+A)$ which can be reduced to $\Phi/R(1+A/N)$. In the present embodiment where N = eight bits and A = seven bits, the word rate on channel 127 equals $\Phi/1.875R$. Consequently, for any significant bandwidth compression ratio, R, the word rate on channel 127 is considerably reduced from the sampling rate $\Phi$. When the video signals which are processed by the present system have resulted from relatively calm scenes of the type which are viewed in video telephone systems, the instant embodiment with a bandwidth compression ratio of 8 will provide a picture at the receiving end of the system with negligible degradation. For a bandwidth compression ratio of 8, the word rate on channel 127 equals $\Phi/15$.

As pointed out hereinabove, the clock pulse rate in the receiving location, $\Phi_r$, is derived from the pulse train $\Phi_2$ on channel 127 to be equal in rate to the clock pulse train, $\Phi$, in the transmitting location in order to drive the counters in the receiving location at the same rate as the counters in the transmitting location. Accordingly, buffer memory 203 which is read out by pulses in pulse train $\Phi_r$ can be read out at a rate much faster than the rate at which words are being received on channel 127. As a result, unless a backlog of words is present in the receiving buffer memory before this memory is permitted to read out, an error may be introduced primarily because of the shorthand method of addressing in which only the horizontal position of a picture element is expressed. To place each picture element in the receiving frame memory 216, it must be properly referenced to the correct first picture element in its scanning line. To illustrate how an error could occur without a backlog in the buffer memory, assume that one of the 15 picture elements following the first picture element in the first frame has been transmitted. A proper referencing would not be achieved if the buffer memory were permitted to immediately read out after receiving the first picture element in the frame since the counters in the receiver are advanced at a rate equal to the clock rate, $\Phi$, and the address for any one of the 15 picture elements following the first picture element in a frame would be presented by the counter to the address comparator at a time earlier than the instant at which the digital word corresponding to that picture element would be received by the receiver's buffer memory. As a result, even though the proper position in the video frame for that digital word would be in the same line as the first picture element of the video frame, it would be improperly placed by the address comparator as a picture element in a succeeding line having the same horizontal position in that succeeding line. In order to insure that this error of improper placement will not occur in the receiving frame memory, the reciever's buffer memory is constructed to have a capacity equal to that of the transmitting buffer memory, and circuitry within the receiver prohibits readout of the receiver's buffer memory until the memory has been initially filled to capacity.

To accomplish the first step of initial synchronization, a pulse generator 332 in FIG. 3 is activated either manually or automatically after a complete connection is established over channel 127 between the transmitting and receiving locations. The pulse from generator 332 energizes the set input of a flip-flop 333. With flip-flop 333 set, one input of an AND gate 334 is energized. The other input of AND gate 334 is connected to line 322 at the output of counter 319. As indicated hereinabove, a voltage pulse appears on line 322 at the instant when both counters 309 and 319 are reset to their 0 positions. At that instant AND gate 334 is activated thereby causing a flip-flop 335 to be set and in addition causing an energizing pulse to be delivered to the input of a delay circuit 336. Finally, activation of AND gate 334 causes flip-flop 333 to be cleared thereby removing the energizing signal from one input of gate 334 in order to prevent gate 334 from being activated by any succeeding $\Phi_f$ pulses on line 322. With flip-flop 335 in its set state, the energizing signal provided at its 1 output causes word generator 347 to produce an eight bit digital word existing in parallel data form on bus 348 and having logical 1's in each of the bit positions. Each clock pulse in pulse train $\Phi_1$ from delay circuit 344 causes gate 409 to couple this all 1 digital word through to the input of frame memory 104.

The energizing signal from flip-flop 335 in the set condition is also coupled to the initial inputs of AND gates 412 and 413 and transmission gate 414. As a result, no energizing signals are permitted to be coupled by AND gate 412 to the write input of memory 115 and similarly no energizing signals are permitted to be coupled through AND gate 413 to the read input of memory 115. In an interval equal to the delay time of circuit 336 after flip-flop 335 has been set, the energizing pulse from delay circuit 336 causes buffer memory 115 to be reset to a completely cleared condition and forward-backward counter 404 to be reset to its 0 state.

Finally, transfer of flip-flop 335 to its set state energizes one input of AND gate 416 thereby permitting transmission gate 417 to be energized through AND gate 416 by the read out pulses in pulse train $\Phi_2/15$ developed by transmitter 419 line 420. Each time that gate 417 is energized, a 15 bit digital word from a clear word generator 418 is coupled through transmission gate 417 to flip-flop store 415. The word generated by clear word generator 418 may be a word having a logical 1 in each of its bit positions or may be any other uniquely chosen word which does not interfere with any one of the 120 picture element addresses and the unique address for the first picture element of the frame.

These words from generator 418, which are transmitted over channel 127 for the purpose of establishing an identical initial condition in the transmitter and receiver frame memories, will continue to be transmitted as long as flip-flop 335 remains in its set condition. Flip-flop 335 will remain in its set condition until the next voltage pulse is developed on line 322 at the output of counter 319. At this time AND gate 349 having one input connected to the 1 output of flip-flop 335 and its other input connected to line 322 clears flip-flop 335. Hence, flip-flop 335 remains in its set condition for an interval exactly equal to one complete frame time as determined by the transmitting counters 309 and 319. After flip-flop 335 has been cleared, word generator 347 ceases to produce the eight bit digital word on bus 348 and similarly clear word generator 318 is no longer coupled through gate 417 and flip-flop store 415 to the digital transmitter 419. As a result, frame memory 104 is loaded with an entire frame of digital words having logical 1's in each of the bit locations and unique digital clearing words from generator 418 are transmitted over channel 127 to the receiving location.

When flip-flop 335 is cleared through AND gate 349 by the $\Phi_f$ pulse on line 322, counters 309 and 319 are in their 0 position and therefore the start-of-frame word generator 328 is activated. In addition the all 0 condition of the output of counter 309 is detected by AND gate 323 which causes an energizing pulse to be delivered on line 120 through OR gate 406 to one input of AND gate 407. Since an all 0 output from both counters corresponds to the active region of the frame, the other input of AND gate 407 is energized by line 112 and therefore an energizing signal is provided by gate 407 on line 408. As indicated hereinabove, this energizing signal on line 408 causes the digital word on bus 103 to be written into frame memory 104 and into buffer memory 115. Consequently, the first digital word to be written into both the frame memory and buffer memory in the transmitting location after the initial clearing frame of digital words is the word corresponding to the first picture element in the video frame. Henceforth, the transmitter, as described hereinabove operates in the normal fashion of comparing the digital words on bus 103 with those words stored in frame memory 104 and of transmitting those words from bus 103 which are significantly different from those words within memory 104 and those words which are forced to be transmitted even though no significant difference exists.

In the receiving location, a clear word detector 504 connected to the 15 bit output of digital receiver 500 detects the first word received on channel 127 of the words produced by generator 418. In response thereto detector 504 energizes one input of an AND gate 550, the other input of which is connected to receive the pulse train, $\Phi_{w}$, which is developed on line 560 by receiver 500 and which provides an energizing pulse each time that a complete word is presented on bus 501 at the output of receiver 500. With AND gate 550 energized, flip-flop 507 is set, thereby energizing one input of an AND gate 605. The other input of AND gate 605 is connected to the 0 output of a flip-flop 604. Since flip-flop 604 has not yet been set and is in a cleared state since the last use of the reciever, flip-flop 604 provides an energizing signal at its 0 output. Accordingly, the setting of flip-flop 507 causes AND gate 605 to be energized thereby applying an energizing signal to the inhibit input of AND gate 606. With its inhibit input energized, gate 606 is not permitted to pass the pulses from delay circuit 505 to the write input of buffer memory 203.

The setting of flip-flop 507 also causes an energizing signal to be applied to word generator 603 which produces an eight bit digital word with logical 1's in all of its bit position duplicating the action performed at the transmitter by word generator 347. If no energizing signal is present word generator 603 produces no output. This word from generator 603 is coupled by way of bus 602 to the input of transmission gate 651. The clock pulses in pulse train $\Phi_r$ on line 503 are applied to the control input of gate 651 thereby causing this all 1 eight bit digital word to be coupled through transmission gate 651 to the input of frame memory 216.

The setting of flip-flop 507 also removes the energizing signal from its 0 output thereby removing the energizing signal from one input of AND gate 648. Consequently, even though clock pulses in pulse train $\Phi_r$ are coupled through delay circuit 649 to one of the other inputs of gate 648, these pulses are not permitted to pass through gate 648 to the read input of buffer memory 203 as long as flip-flop 507 is in its set condition.

Finally, the setting of flip-flop 507 also removes the energizing signal from one input of AND gate 508 and from the inhibit input of AND gate 551. As a result, the clock pulses on line 503 from receiver 500, although coupled to the other inputs of gates 508 and 551, are not permitted to pass by gate 508 to the input of counter 509, but are permitted to pass by gate 551 to the reset input of both counters 509 and 519. Therefore, as long as flip-flop 507 remains in its set state, clock pulses from receiver 500 on line 503 continue to reset counters 509 and 519 to their 0 positions. As a result, whenever flip-flop 507 is cleared and the first word is read out of the buffer memory, the address provided on bus 561 for comparison with the first word's address is the unique start-of-frame address. As pointed out hereinabove the first word out of the buffer memory is the first picture element in the frame. Accordingly, when the receiver's buffer memory is full and readout is permitted, utilization of the stored data can take place immediately and the buffer memory is rapidly relieved of its full condition.

During the receipt of digital words from clear word generator 418, word generator 603 will provide an all 1 eight bit digital word for insertion into the frame memory 216 by way of transmission gate 651 for one complete frame. As pointed out hereinabove, the first word to be transmitted following the sequence of clearing words from generator 418 is the word corresponding to the first picture element in the video frame. When digital receiver 500 presents the start-of-frame word detector 552 with the seven bit unique address corresponding to the first picture element in the frame, detector 552 generates an energizing signal at one input of AND gate 607. A second input of AND gate 607 has been previously energized by the energizing signal from the 1 output of flip-flop 507, and a third input of AND gate 607 is energized by the energizing signal at the 0 output of flip-flop 604. Consequently, when the fourth input of gate 607 is presented with a pulse from pulse train $\Phi_{w}$ on line 560, AND gate 607 sets flip-flop 604 and resets buffer memory 203 to its cleared state. The setting of flip-flop 604 removes an energizing signal from one input of AND gate 605 thereby removing the energizing signal from the inhibit input of AND gate 606. As a result the pulse from delay circuit 505 is permitted to pass through gate 606 to energize the write input of buffer memory 203, and the 15 bit digital word corresponding to the first picture element in the video frame is coupled via bus 501 from receiver 500 into memory 203.

At this point, flip-flop 507 has not yet been cleared and therefore the one input of AND gate 648 which is connected to the 0 output of flip-flop 507 is not yet energized. Therefore, the clock pulses from delay circuit 649 are not permitted to be coupled through AND gate 648 and OR gate 650 to the read input of buffer memory 203.

The energizing signal delivered by AND gate 606 to the write input of memory 203 is also coupled to the input of full buffer counter 204. Counter 204 has been reset by the energizing signal from AND gate 550 when flip-flop 507 was set. Consequently, each word written into memory 203 causes counter 204 to be advanced by one and the count achieved therein is a direct indication of the number of words written into buffer memory 203. When counter 204 achieves a count which indicates that buffer memory 203 is filled to its maximum capacity, counter 204 couples an energizing signal over line 205 to one input of an AND gate 608 another input of which is already energized by the 1 output of flip-flop 507. The energizing signal produced by AND gate 608 in response to the output from counter 204 is coupled through a delay circuit 609 and OR gate 650 to the read input of buffer memory 203. As a result, after buffer memory 203 has been filled to its maximum capacity the first word is read out of memory 203 into the flip-flop store 615.

The energizing signal at the output of delay circuit 609 is also utilized to clear flip-flops 604 and 507. With flip-flop 507 in its cleared state, the energizing signal provided at its 0 output activates one input of AND gate 648 and, in addition activates one input of AND gate 508 and an inhibit input of AND gate 551. As a result, a each clock pulse produced on line 503 is permitted to pass through gate 508 to the input of counter 509, thereby advancing the output of the counter by one with each succeeding clock pulse.

As pointed out hereinabove, the first digital word to be written into buffer memory 203 corresponds to the first picture element in a video frame. Since memory 203 operates on a first-in first-out basis, the first 15 bit word read out of memory 203 into flip-flop store 615 is the word corresponding to the first picture element of the frame. Furthermore, counters 509 and 519 have been held in their 0 positions by the clock pulses on line 503 which are coupled through gate 551 for the entire interval during which flip-flop 507 is held in its set state. Consequently, when the first digital word is presented to flip-flop store 615, address counters 509 and 519, being in their 0 positions, will cause the unique start-of-frame address word to be generated on bus 534 by generator 533. With the seven bit address in flip-flop store 615 indentical to the address being produced by generator 533 on bus 561, address comparator 645 delivers an energizing signal to one input of AND gate 646. Since an energizing signal is also coupled by way of line 542 to the other input of AND gate 646 during the active region of the frame, the energizing signal from comparator 645 is coupled through AND gate 646 to one input of AND gate 648 and to the control inputs of transmission gates 644 and 647.

Appearance of an energizing signal out of AND gate 646 inhibits transmission gate 647 from coupling the output digital word from frame memory 216 back to the memory's input. Instead, gate 644 is energized, thereby causing the eight bit digital word corresponding to video amplitude in flip-flop store 615 to be coupled through gate 644 to the inputs of transmission gates 651 and 652. Appearance of the next clock pulse on line 503 causes gate 651 to couple this eight bit digital word into the frame memory 216. Gate 652 is energized during the entire active region of the frame, and therefore the eight bit digital word is also coupled through to the input of decoder 218.

With an energizing signal from AND gate 646 and an energizing signal from the 0 output of flip-flop 507 at two inputs of AND gate 648, the next clock pulse from delay circuit 649 causes AND gate 648 to couple an energizing signal through OR gate 650 to the read input of memory 203. In this way the next word is coupled out of the buffer memory into flip-flop store.

At this point, the receiving apparatus continues to operate in the fashion described hereinabove in connection with the operation after initial synchronization. Each new word received at the receiving location is written into buffer memory 203 and read out into flip-flop store 615. When its address is identical to the address generated by counter 509, the eight bit digital word corresponding to the video amplitude is coupled into the receiver's frame memory and to the decoder for processing into the analogue form necessary for the display monitor.

CONTROL LOGIC

The input-output characteristic of the control logic circuit 403 is presented in FIG. 10. The abscissa and ordinate for any point between the two axes in FIG. 10 determine whether or not control logic circuit 403 will produce an output on line 405. If a point is on the staircase curve in FIG. 10 or between the curve and the axis of ordinates, an energizing signal is developed on line 405, thereby causing the digital word on bus 103 to be written into buffer memory 115 if the word is from the active region of the video frame. If, however, a point is between the staircase curve in FIG. 10 and the axis of abscissas, no energizing signal is developed on line 405. An abscissa of any point in FIG. 10 relates to the number of words in buffer memory 115 as indicated by the output from forward-backward counter 404. An ordinate of any point in FIG. 10 relates to the magnitude of the difference indicated by the eight bit digital output form subtractor circuit 105.

Three important characteristics illustrated by the curve in FIG. 10 should be noted. First, the more words that exist in buffer memory 115 the larger the difference as indicated by circuit 402 must be in order to produce an energizing signal on line 405. As a result of this characteristic, with the buffer memory almost filled to its capacity, only the largest changes in the video amplitude of picture elements will be considered as changes of such significance as to warrant the writing of a new video amplitude into buffer memory 115. With very few words in the buffer memory, however, smaller changes in picture elements from one frame to the next will be considered as significant changes by control logic circuit 403.

The second characteristic of FIG. 10 to be noted is that for words fewer than a predetermined number (128 for the instant embodiment), an energizing signal is produced on line 405 independent of the difference indicated by subtractor circuit 105. Two important results are achieved by this second characteristic:

1. Picture elements are replenished in the receiving location even though no significant difference has been registered in that picture element, thereby causing corrections to be made in picture elements which may have been changed erroneously by noise in transmission channel 127.

2. The vertical flyback interval is a time during which no picture elements are available to the buffer memory from the camera circuit 100. Accordingly, a very low level of storage in the buffer memory near the end of the active region might result in the absence of digital words in the buffer memory to be sent by the transmitter before the start of the next active region. By requiring at least 128 words to exist in the buffer memory at all times, buffer memory 115 will never be completely emptied during the vertical and horizontal flyback intervals. Accordingly, time on transmission channel 127 will not be wasted but will be utilized to transmit redundant samples, thereby causing corrections in any noise-produced errors.

For some predetermined number of words in buffer memory 115 (49,152 in the present embodiment), the buffer memory is filled to its maximum capacity. The third characteristic of FIG. 10 to be noted is that when this maximum number of words is stored in the buffer memory, an energizing signal cannot be produced on line 405 no matter what difference is indicated by circuit 105. As a result, once a word has been stored in the buffer memory it is assured of being transmitted without being destroyed or modified by a subsequent word. This fact is especially important with respect to the words corresponding to the first picture element of each line since as indicated hereinabove, these words are necessary in order to maintain synchronism between the transmitting and receiving locations.

Figure 9:
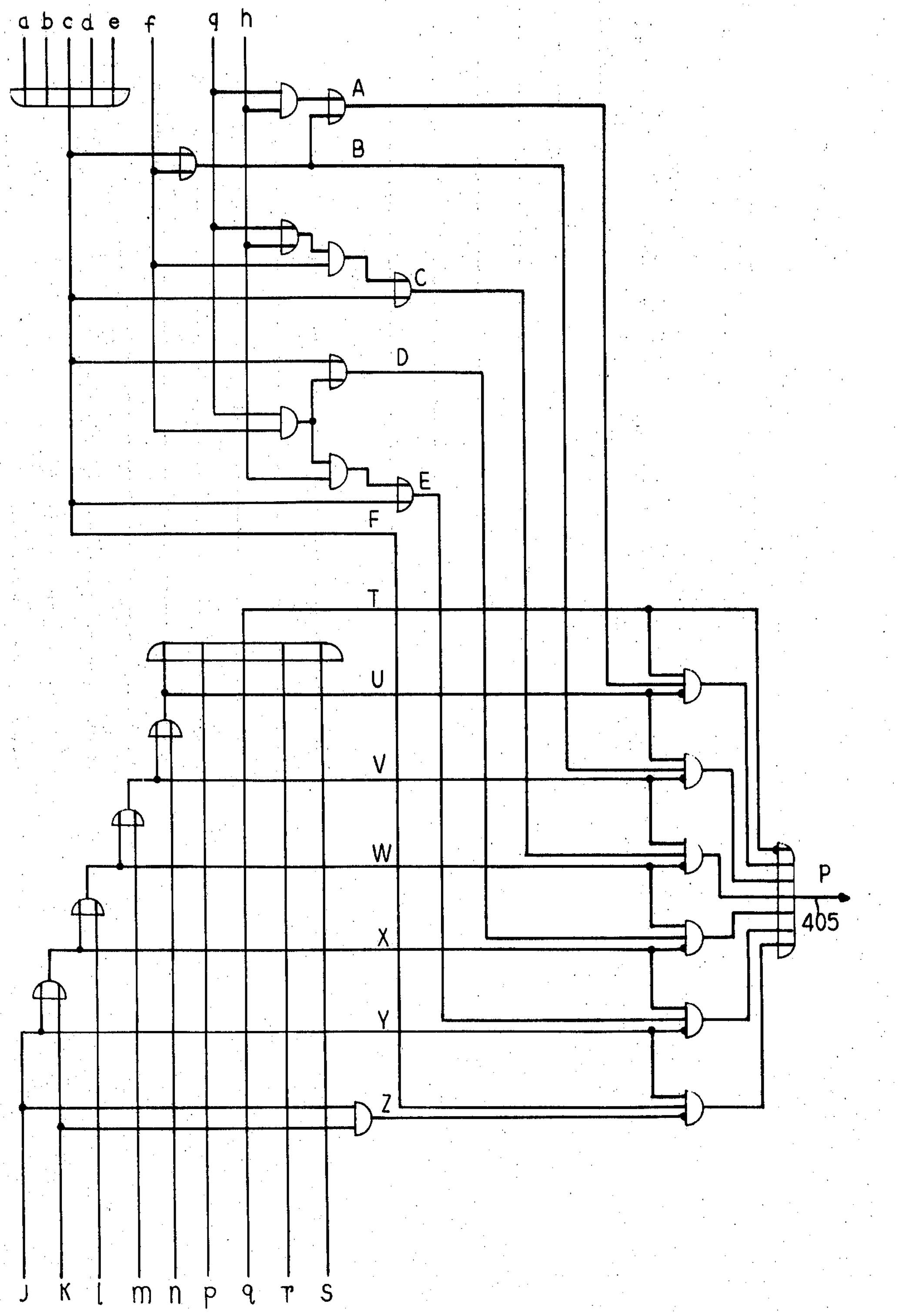
FIG. 9 is a detailed schematic block diagram of the control logic circuit shown as a block in FIG. 4.

To implement the input-output characteristics of control logic circuit 403, as illustrated in FIG. 10, an embodiment of the type shown in schematic block diagram form in FIG. 9 may be utilized. Letters *a, b, c, d, e, f, g,* and *h* —represent the eight bit digital output word from subtractor circuit 105 with *a* representing the most significant bit and *h* representing the least significant bit. Letters *j, k, l, m, n, —p,* q, *r,* and *s* represent the nine most significant bits available from 16 bistable circuits present in forward-backward counter 404. For the parameters chosen in this embodiment for the control logic circuit 403 only the nine most significant bit are used. The *j* represents the most significant bit in the 15 bit digital word available in counter 404 and the *s* represents the least significant bit of the nine most significant bits in that word. Hence, a logical 1 in the *s* position with 0's in all of the other eight most significant bit positions represents a count of at least 128 in forward-backward counter 404.

Two large letters indicated along the staircase curve shown in FIG. 10 relate to the conditions present on the identically designated lines shown in FIG. 9. The presence or absence of a logical 1 on the lines designated by the letters A, B, C, D, E, and F is determined by the output produced by subtractor circuit 105. Conditions on the lines designated by these letters provide an indication as to the magnitude of the difference detected by circuit 402. For example, if an energizing signal is present on line A, it can be determined from FIG. 9 that a logical 1 must be present either on both input *g* and *h* or on one of the other inputs from subtractor circuit 105. With this type of condition produced by the output from circuit 105, the difference indicated by the eight bit digital word at the output of circuit 105 must be greater than or equal to three. If a logical 0 exists on line A in FIG. 9 it is known that the difference must be less than three. Hence, the designation in FIG. 10 of A=1 for all points having a difference of greater than or equal to three, and the designation of A=0 for all points having a difference of less than three. In a similar fashion, differences greater than or equal to the values of 4, 5, 6, 7, and 8 are indicated by the presence or absence of a logical 1 on the lines designated in FIG. 9 as B, C, D, E, and F, respectively.

To operate with the control logic circuit 403 shown in FIG. 9, buffer memory 115 was constructed to have a capacity of 49,152 digital words. If *j* and *k* are the two most significant bits in the fifteen bits available from counter 404, an energizing signal in both the *j* and *k* positions indicates that the counter 404 has registered a number at least equal to or greater than 49,152. The control logic circuit as indicated by FIG. 10 never permits the buffer memory to accept more than 49,152 words. Therefore, an energizing signal representing a logical 1 on line Z in FIG. 9 indicates that the buffer memory is filled to capacity. Accordingly, a number of words in the buffer memory equal to 49,152 is designated in FIG. 10 as Z=1 and a number less than this in the buffer memory is designated as Z=0.

The vertical flyback interval in the present embodiment is equal in duration to the time required to scan twelve lines of 140 picture elements or a total of 1,680 picture elements. Since digital transmitter 419 produces read out pulses on line 420 at a rate equal to one-fifteenth that of the rate at which picture elements are scanned, the number of words that can be read out from the buffer memory during the vertical blanking interval and during the last horizontal interval immediately prior to the vertical blanking interval is equal to 1,700 divided by 15, or about 114 words. If a logical 1 is present on any one of the nine most significant outputs from counter 404, the counter must have registered a count equal to or greater than 128. A logical 1 present on any one of these outputs will produce an energizing signal on line T in FIG. 9. If no energizing signal is present on line T it may be concluded that the count in forward-backward counter 404 is less than 128. Hence less than 128 words in buffer memory 115 is designated in FIG. 10 as T=0 and a number of words equal to or greater than 128 is designated as T=1. In a similar fashion, energizing signals (indicating logic 1's) on the lines designated as U, V, W, X, Y in FIG. 9 represent levels in buffer memory 115 equal to or greater than those designated on the axis of the abscissas in FIG. 10.

By utilizing the logical conditions present on each of the lines designated with a large letter in the circuitry shown in FIG. 9, an output energizing signal is developed on line 405 in accordance with the characteristics defined by the staircase curve in FIG. 10.

A summary of the operation of circuit 403 is presented in the following table in which:

+ indicates a logical OR operation,
· indicates a logical AND operation, and
‾ indicates the inverse or complement of the function so marked.

| Difference indicated by Circuit 105 | Indicated in Circuit 403 by | Where |
|---|---|---|
| <3 | A=0 | A=a+b+c+d+e+f+g·h |
| ≥3 | A=1 | A=a+b+c+d+e+f+g·h |
| ≥4 | B=1 | B=a+b+c+d+e+f |
| ≥5 | C=1 | C=a+b+c+d+e+f(g+h) |
| ≥6 | D=1 | D=a+b+c+d+e+f·g |
| ≥7 | E=1 | E=a+b+c+d+e+f·g·h |
| ≥8 | F=1 | F=a+b+c+d+e |

| Count in Circuit 404 | Indicated in Circuit 403 by | Where |
|---|---|---|
| <128 | T=0 | T=j+k+l+m+n+p+q+r+s |
| ≥128 | T=1 | T=j+k+l+m+n+p+q+r+s |
| ≥2,048 | U=1 | U=j+k+l+m+n |
| ≥4,096 | V=1 | V=j+k+l+m |
| ≥8,192 | W=1 | W=j+k+l |
| ≥16,384 | X=1 | X=j+k |
| ≥32,768 | Y=1 | Y=j |
| ≥49,152 | Z=1 | Z=jk |

Logical circuit 403 produces an energizing signal on line 405 when the following equation results in a logical 1.

P=T+TUA+UVB+VWC+WXD+XYE+YZF.

While a particular embodiment of the invention has been described in detail, many further variations may be employed without departing from the spirit and scope of the claims which follow herein.

I claim:

1. In a redundancy reduction system for transmitting samples from a video signal which differ in amplitude from their corresponding samples having the same location in a previous video frame, means for addressing the transmitted samples comprising means for forcing the transmission of a reference sample in each video frame and periodic samples at subintervals within said video frame whether or not a difference exists between these samples and their corresponding samples from a previous frame, and means for generating and transmitting with each transmitted sample an address code which indicates the relative position of said each transmitted sample within said subinterval of said video frame.

2. In a system as defined in claim 1 wherein the addressing means includes means for generating a unique address code for the reference sample in a video frame.

3. In a redundancy reduction system for transmitting a signal having redundant periodic intervals, means for periodically sampling said signal, mean for transmitting a sample at the beginning of each of said periodic intervals and at periodic subintervals within each of said periodic intervals, a means for developing the amplitude difference between each other sample within each of said subintervals and its corresponding sample having the same time location within a previous periodic interval, means for transmitting said each other sample if a significant amplitude difference is determined to exist, and means for transmitting with each transmitted sample an address code which indicates the time position of said transmitted sample within said subinterval.

4. In a system as defined in claim 3 wherein the means for transmitting an address code further includes means for generating a unique address code for the sample at the beginning of each of said periodic intervals.

5. Transmitting apparatus for reducing the redundancy in the transmitted information derived from a video signal having time intervals and subintervals identified as frames and lines, respectively, said apparatus comprising means for sampling said video signal at a plurality of corresponding during each of said line subintervals, means for storing samples from one complete frame of said video signal, means for developing the amplitude difference between each sample and its corresponding sample from a previous frame stored in said memory means and having the same line location, means for coupling said each sample to a transmission channel if a significant amplitude difference is found to exist, means for generating an address code to be transmitted with each transmitted sample, the address code for the first sample in a video frame being a unique word and all other codes indicating only the line position of its corresponding sample.

6. Apparatus as defined in claim 5 which includes a means to load said memory means with an initial frame of identical samples, and means for coupling this frame of identical samples to said transmission channel.

7. In a redundancy reduction system in which a sample is transmitted from a video signal having time intervals called frames and scan lines only if the sample differs significantly in amplitude from a corresponding sample in a previous video frame, the transmitted samples being utilized at a receiving end of the system to replenish samples in a frame memory which stores samples for an entire video frame, means for addressing each of the transmitted samples in order to insure that the proper samples are replenished in the frame memory at the receiving end of the system, said addressing means comprising means for generating a unique code for the first sample in a video frame, means for generating code words which indicate the positioning of each sample in a scan line of said video signal, and means for forcing the transmission of the first sample in a video frame and the first sample in each video scan line whether or not a significant difference is found to exist.

8. In a redundancy reduction system as defined in claim 7 wherein the receiving end of the system includes means for prohibiting replenishment of said receiving frame memory until a predetermined number of samples have been received.

9. Redundancy reduction transmitting apparatus for use with video signals having time intervals defined as frames, scan lines and horizontal and vertical flyback intervals, said apparatus comprising means for periodically sampling said video signal, memory means for storing a complete frame of samples, means for amplitude comparing each sample with its corresponding sample stored in said memory means having the same position in a video frame, buffer memory means for storing the samples to be transmitted, means for writing a sample into said buffer memory means when a significant difference is found to exist by said amplitude comparison means, means for generating an address word which indicates the position of each sample in its scan line, means for generating a unique word, means for writing the first sample of each video frame and the first sample of each scan line into said buffer memory mean whether or not a difference is found to exist by said amplitude comparison means, means for writing the unique word into said buffer memory along with said first sample of each video frame and for writing said address word into said buffer memory along with all other samples written into said buffer memory means, and means for reading out the samples and words stored in said buffer memory means and coupling them to a transmission channel.

10. Transmitting apparatus as defined in claim 9 wherein the address generating means includes means for prohibiting writing into said buffer memory means during the horizontal and vertical flyback intervals in said video signal.

11. Transmitting apparatus as defined in claim 9 wherein said amplitude comparison means includes means for determining the remaining capacity of said buffer memory means.

12. Apparatus as defined in claim 9 wherein the apparatus further includes means for generating a complete frame of identical words, and means for coupling the complete frame of identical words to said frame memory as an initial frame of video samples.

13. Receiving apparatus for generating a continuous video signal having time intervals defined as lines and frames in response to received video samples representing elements in a video frame which have changed from a previously received video frame, each of said video samples having associated therewith an address code word which indicates the position of its corresponding video sample within its respective line interval, said apparatus comprising a buffer memory for storing each of said received video samples, a display monitor having a scanning beam, an address generator means for developing code words which indicate the relative position of the scanning beam within said display monitor, means for comparing the word generated by said address generating means and the address code word associated with a video sample stored in said buffer memory means, means for reading out said buffer memory means in response to an output from said comparison means indicating that said generated word and said address code word are identical, means for coupling the output from said buffer memory means to a frame memory, and means for coupling the information in said frame memory to said display monitor.

14. Apparatus as defined in claim 13 wherein the means for reading out said buffer memory means includes an AND circuit, one input of which is energized after said buffer memory means has been initially filled to its maximum capacity.

15. A redundancy reduction transmitting apparatus for use with video signals having time intervals defined as frames and subintervals defined as lines having horizontal and vertical flyback intervals, said apparatus comprising pulse generating means, means for sampling said video signal in response to said pulse generating means, means responsive to said pulse generating means for developing a first digital word which indicates the position of each video sample in a line subinterval and a second digital word which indicates the line in a video frame which contains said each video sample, means for amplitude comparing each video sample with a corresponding sample from a previous frame having the same position in said previous frame, a buffer memory means having an input and an output and read and write control inputs, means for coupling each video sample and said first digital word to the input of said buffer memory means, means for activating the write control input of said buffer memory means both when a significant amplitude difference is found to exist by said amplitude comparison means and when said generating means indicates by said first digital word that the first sample in each line is being presented to the input of said buffer memory means, and means for activating the read control input of said buffer memory means to a transmission channel.

16. Transmitting apparatus as defined in claim 15 wherein the word generating means includes means for generating a unique word when the first sample of a video frame is presented to the input of said buffer memory means.

17. Transmitting apparatus as defined in claim 15 wherein the generating means includes means responsive to said first and second digital words for preventing activation of the write input of said buffer memory means during the horizontal and vertical flyback intervals.

18. Transmitting apparatus as defined in claim 15 wherein said amplitude comparison means includes means for detecting the remaining capacity of said buffer memory means, whereby the write control input is activated when the number of samples stored in said buffer memory is lower than a predetermined threshold level regardless of whether or not a significant amplitude difference is found to exist by said amplitude comparison means.

19. A redundancy reduction receiving apparatus for generating a video display in response to video samples received on a transmission channel each of which video samples has associated therewith an address word which indicates the position of the video sample in a scanning line within a video frame, means for generating a pulse in response to receiving each video sample, a display monitor for generating a video display in response to a continuous video signal, means responsive to said pulse for generating a first digital word representing the line position of the scanning beam in said display monitor and a second digital word representing the number of the line being scanned by said display monitor, a buffer memory means having an input and an output and read and write control inputs for storing each of the received video samples, a counting means responsive to said developed pulse for generating an energizing signal after said buffer memory means has been initially filled to its maximum capacity, a comparison circuit for generating an energizing signal at its output when the first digital word developed by said generating means is identical to the address word associated with a video sample available for readout from said buffer memory means, means for energizing the read control input of said buffer memory means in response to the presence of energizing signals from both said counter means and said comparison circuit, means for coupling the output of video samples from said buffer memory means to the input of a frame memory means, and means connected between said frame memory means and said display monitor for generating a continuous video signal in response to the video samples stored in said frame memory.

20. Receiving apparatus as defined in claim 19 wherein said buffer memory means is prohibited from storing input video samples until a unique address word associated with the first video sample in a frame is received.